United States Patent

Renoux

[11] 3,907,480
[45] Sept. 23, 1975

[54] APPARATUS FOR PROCESSING THIN PLASTICS FILM

[76] Inventor: Robert A. Renoux, 80 Avenue Lefebvre, Les Cles de la Foret, 78300 Poissy, France

[22] Filed: Jan. 7, 1974

[21] Appl. No.: 431,490

[30] Foreign Application Priority Data
Jan. 8, 1973 France .................... 73.00506

[52] U.S. Cl. ................. 425/385; 34/156; 425/383; 425/DIG. 200; 425/810
[51] Int. Cl.² .......................................... B29C 17/00
[58] Field of Search .......... 425/383, 385, 810, 384, 425/408, DIG. 200, DIG. 201, 407; 264/107; 34/156

[56] References Cited
UNITED STATES PATENTS

| 927,995 | 7/1909 | Morrow | 34/156 |
|---|---|---|---|
| 2,928,124 | 3/1960 | Hugger | 425/385 X |
| 3,113,905 | 12/1963 | Rosen | 425/810 X |
| 3,230,637 | 1/1966 | Taylor, Jr. | 34/156 |
| 3,287,821 | 11/1966 | Schregenberger | 34/156 |
| 3,422,522 | 1/1969 | Mojonnier | 425/388 |
| 3,537,138 | 11/1970 | Brown et al. | 425/384 X |
| 3,559,301 | 2/1971 | Fraser | 34/156 |
| 3,662,476 | 5/1972 | Capizzi | 34/156 |

Primary Examiner—Robert L. Spicer, Jr.
Attorney, Agent, or Firm—Finnegan, Henderson, Farabow & Garrett

[57] ABSTRACT

Apparatus for processing thin plastics film particularly for use in manufacturing gramophone records comprises an oven, a moulding press and mechanical means for the step-wise advancement of the film. The oven consists of an elongate enclosure which is connected to a regulated source of hot air. The enclosure has horizontal parallel deflectors arranged transversely along its entire length and the deflectors are arranged in two zones in which they are all inclined upwardly and respectively towards the inlet and the outlet of the enclosure. The arrangement is such that the film is supported in the enclosure on a cushion of air and with a feed loop formed near each end of the enclosure.

4 Claims, 2 Drawing Figures

US Patent  Sept. 23, 1975  3,907,480
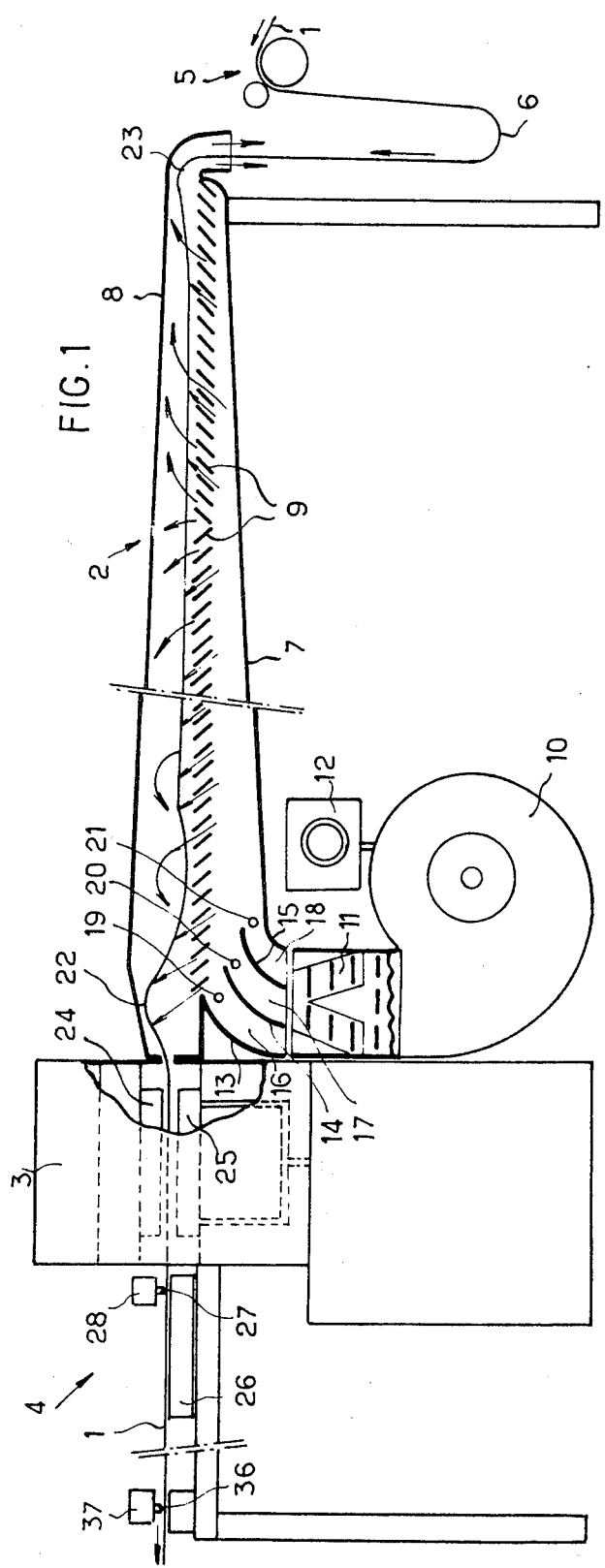
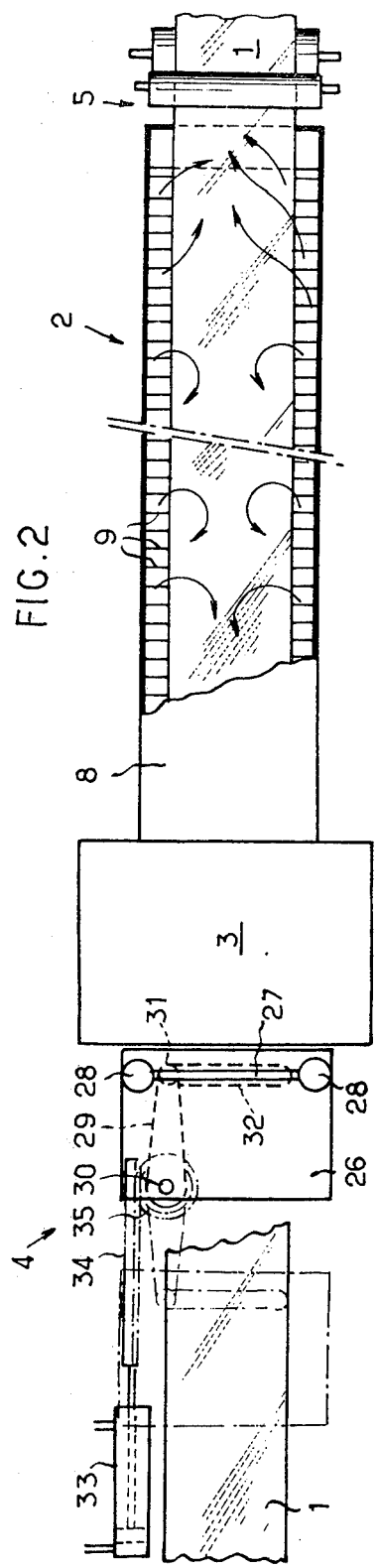

APPARATUS FOR PROCESSING THIN PLASTICS FILM

The present invention concerns an apparatus for processing thin plastics films for use in particular in the manufacture of flexible gramophone records, which apparatus is of the type that comprises an oven for the thermal preparation of the film, a moulding press and a mechanical means for the stepwise advance of the film, these units being disposed in that order along the path of travel of the film.

It is well-known that the thermal preparation of plastics films for use in the manufacture of flexible gramophone records is of the greatest importance as regards the quality of the products obtained and also as regards the constancy of this quality during the time that the film is in the production line.

It is desirable to present to the moulding or pressing tools a film at a temperature as close as possible to that of its melting point so that the precision with which the moulding or pressing can be carried out is in the order of ± 1 micron, and this obviously poses handling problems. Furthermore, the film should be brought to the required temperature fairly gradually, this being necessary for its molecular reorientation. Any direct contact between the film and a hot point, or a rise in temperature that is not fairly gradual will in fact set up stresses in the material of the film, and the article that is then pressed or formed from this film will "remember" this.

The particular object of the present invention is to provide a processing apparatus whereby these objects can be achieved.

For this purpose, the apparatus in accordance with the invention is characterized in that the oven is constituted by an elongate enclosure in the form of a tunnel which is connected to a regulated hot-air supply source and which is provided with horizontal parallel deflectors arranged transversely along its entire length, the deflectors being divided into two zones, the deflectors in one of these zones being inclined in a direction opposite to that in which the deflectors in the other zone are inclined and the deflectors sloping upwards towards the respective ends of the enclosure, the arrangement being such as to ensure that the film is supported on a cushion of air and at the same time a feed loop is formed at each of the two ends of the enclosure.

In one particular embodiment of the invention, the deflectors are inclined at an angle of approximately 45° to the horizontal, and the point at which their direction of inclination changes is located at a position approximately one third along the length of the enclosure measured from the inlet end of the latter.

The film is thus fully supported by a cushion of air and can therefore be readily brought to a temperature very close to that of the melting point without any risk of its breaking, due particularly to the presence of the two end loops which permit the film to be advanced stepwise without any tensile force being applied to it.

Preferably, the oven is connected to the hot-air supply source through a duct leading to the lower part of the enclosure and entering the enclosure near its outlet end, this duct being provided with two dividing shutters so as to create three superposed horizontal streams of hot air which are directed towards the inlet end of the enclosure and the temperatures of which can be adjusted separately.

By means of this arrangement, it is possible to adjust the temperatures of the two faces of the film separately, the upper stream of hot air mainly heating the lower face of the film, whereas the median and lower streams of hot air pass more readily along the sides of the enclosure and through the deflectors so that they mainly heat the uppper face of the film. A rise in the temperature of the film that is gradual is automatically achieved, the hotter part of the film being located near the point where pressing is carried out, that is to say at the point where the higher temperature is required.

Advantageously, means are provided for varying the quantity of hot air passed into the enclosure as a function of the required adjusted temperature which is measured by pyrometers fitted at appropriate locations within the enclosure.

It is thus possible to set the temperature immediately at the desired level despite the inertia of the heating means constituted for example by ribbed electric resistors.

Furthermore, the mechanical means for the stepwise advance of the film may be constituted by a movable table which is equipped with a filmclamping device and to which is imparted a translatory reciprocatory movement by means of a variable motion rod, one end of which engages in a transverse groove in the table.

An arrangement of this kind makes it possible in a very simple way to cause the table to execute a movement which is initially extremely slow, reaches maximum acceleration when the rod is aligned with the guide groove, and then slows down until it finally ceases, this eliminating any danger of breakage of the film.

One form of construction of the apparatus of the invention will now be described by way of example with reference to the accompanying drawing, in which:

FIG. 1 is a simplified longitudinal section through a processing apparatus, and

FIG. 2 is a simplified plan view of this apparatus.

The apparatus illustrated in FIGS. 1 and 2 is designed specifically for use in the manufacture of flexible gramophone records from a continuous thin plastics film 1 which comes from a supply reel, not illustrated. This apparatus mainly comprises an oven 2 for the thermal preparation of the film, a moulding press 3 of a conventional kind used for pressing gramophone records, and a mechanical means, designated as a whole by the reference numeral 4, for the stepwise advance of the film, these units being disposed in that order along the path of travel of the film.

Before entering the oven 2, the film 1 passes through feed rolls 5 which are designed and arranged to form, just upstream of the oven, a loop 6 of film of predetermined length, detection means of a known kind, not illustrated, being used for this purpose.

The oven 2 is constituted mainly by an elongate enclosure in the form of a tunnel and consists of two parts, namely a lower fixed part 7 and an upper part 8 constituting a removable cover which provides access to the interior of the oven. This oven is provided with parallel horizontal deflectors 9 which are disposed transversely of the oven over its entire length. It will also be seen that the deflectors are divided into two zones, the deflectors in one zone being inclined in an opposite direction to those in the other zone, all the deflectors sloping at an angle of 45° to the horizontal and upwardly towards the respective ends of the enclosure.

In the particular form of construction here described, the point at which the deflectors change there direction of slope occurs at a position located one-third along the length of the enclosure measured from the inlet and thereof.

The outlet end of the enclosure is connected at its lower part to a hot-air supply source consisting mainly of an air generator 10, a heating unit 11, constituted for example by ribbed electric resistors, and an adjusting means 12. On the output side of the heating unit 11 is an elbow 13 enclosing two dividing vanes 14 and 15 which, together with the walls of the elbow, delimit three superposed horizontal streams of hot air 16, 17 and 18 which are directed towards the inlet end of the enclosure. Furthermore, the heating unit 11 is so designed that the temperatures of the three superposed streams of hot air can be adjusted separately with the aid of three pyrometers 19, 20 and 21 associated with the regulating means 12. This regulating means not only acts on the heating unit 11 but also regulates the quantity of air provided by the generator 10, so that very rapid changes in temperature can be brought about despite the thermal inertia of the electric resistors.

When the hot air is injected into the interior of the enclosure 7–8, each pair of inclined deflectors 9 constitutes a small injector and these injectors support the film 1 on a veritable cushion of air while enabling it to advance gradually. This support for the film is mainly provided by the upper air stream 16 which at the same time heats the lower face of the film. The median and lower air streams 17 and 18 respectively pass along the sides of the enclosure and heat the upper face of the film. Since the temperatures of all these streams of air can be adjusted separately, it will be obvious that, if required, there will be no difficulty in establishing a different temperature on each of the faces of the film. It is in fact sometimes advantageous for that face of the film that is to be presented to the moulding matrix to be hotter than the other face.

The hot air injected into the enclosure 7–8 is finally discharged therefrom at the inlet end. It should be stated that the cross-section of this enclosure diminishes progressively towards the inlet end in order to maintain in the interior of the enclosure an air pressure sufficiently great to ensure that the film is correctly supported over the entire length of the oven. It will also be seen that with an arrangement of this kind the gradual rise in temperature of the film, necessary for its molecular re-orientation, is achieved automatically, the hottest point on the film of course occurring in the zone where the streams 16–18 of hot air are injected, and therefore close to the point where pressing is carried out, i.e. at the place where the higher temperature is most needed.

As will be readily seen from FIG. 1, the particular disposition of the deflectors 9, divided into two groups inclined in opposite directions, also results in the formation of a feed loop 22 and 23, one at each end of the enclosure 7, 8. This enables the film to be moved forward under the press 3 without applying any tensile force to it, and therefore without the risk of its breaking.

The precise timed advance of the film 1 between the two press platens 24 and 25 that is necessary for pressing a succession of gramophone records is achieved by the special stepwise means 4 which will now be described by particular reference to FIG. 2. These means comprise firstly a movable table 26 which is disposed horizontally below the film 1 and is provided with a film-clamping device 27 actuated by two lateral piston-and-cylinder units 28. A translatory reciprocatory movement over the path of travel of the film is imparted to the moving table 26 by a rod 29 which is mounted for rotation about a fixed vertical pivot 30 and one end of which carries a roller 31 which engages in a tranverse groove 32 in the table. Rotary movement of the rod 29 is imparted by a piston-and-cylinder unit 33 which operates in synchronism with the press 3 and which moves a rack 34 that engages a pinion 35 firmly connected to the rod. Also, the extent of the displacement of the rack 34 is such that the rod 29 is displaced angularly in alternate directions through an angle of approximately 180°. The means just described is completed by a second film-clamping device 36 which is actuated by piston-and-cylinder units 37, this device being designed to retain the film 1 during the return movement of the movable table 26.

This means for the stepwise advance of the film operates in the following manner.

Initially the movable table is in the position illustrated in FIGS. 1 and 2, the rod 29 being parallel with the line of travel of the film. The platens 24 and 25 of the press 3 are opened, the clamping device 27 is applied to the film by the piston-and-cylinder units 28 whilst at the same time the actuating piston-and-cylinder unit 33 is caused to operate. The rod 29 is then caused to rotate and its roller 31 first engages the groove 33 in the table 26 tangentially so that initially the table is displaced very slowly. The movement of the table progressively increases in speed to reach the maximum when the rod 29 has reached the 90° position, i.e. when it is aligned with the groove 32, the movement of the table then slowing down progressively until the table ceases its movement at the position illustrated in chain-dotted lines in FIG. 2. Thereafter the press 3 can start up while the table 26 is returned to its initial position. To achieve this, all that is required is to cause the piston-and-cylinder unit 33 to operate in the reverse direction, the film-clamping device 27 having of course first been disengaged from the table and the film-clamping device 36 for holding the film in position having been applied.

It will be readily appreciated that with a means of this kind for advancing the film it is possible to position the film very accurately in the press 3, without any risk of breaking the film, thanks to the accelerated then retarded movement of the movable table 26 that enables the film to be advanced without applying any sudden tensile force to it. During the advance movement of the film, the feed loop 22 located at the entry side of the press is of course used up, but is automatically reformed during the time when the film is stopped for the purpose of pressing the record, so that the next pressing cycle is thus facilitated. The same thing obviously occurs are regards the loop 23 which facilitates entry of the film 1 into the oven.

I claim:

1. Apparatus for processing thin plastics films for use in particular in the manufacture of flexible gramophone records, which apparatus is of the type that comprises an oven for the thermal preparation of the film, a moulding press and a mechanical means for the stepwise advancement of the film, these units being disposed in that order along the path of travel of the film, wherein the oven is constituted by an elongate enclosure in the form of a tunnel which is connected to a regulated hot-air supply source and which is provided with horizontal parallel deflectors arranged transversely along its entire length, the deflectors being divided into two zones, the deflectors in one of these zones being inclined in a direction opposite to that in which the deflectors in the other zone are inclined and the deflectors sloping upwards towards the respective ends of the enclosure, the arrangement being such as to ensure that the film is supported on a cushion of air and at the same time a feed loop is formed at each of the two ends of the enclosure.

2. Apparatus according to claim 1, wherein the deflectors are inclined at an angle of approximately 45° to the horizontal, the point at which their direction of inclination changes being located at a position approximately one-third along the length of the enclosure measured from the inlet end of the latter.

3. Apparatus according to claim 1, when the oven is connected to the hot-air supply source through a duct leading to the lower part of the enclosure and entering the enclosure near its outlet end, this duct being provided with two dividing shutters so as to create three superposed horizontal streams of hot air which are directed towards the inlet end of the enclosure and the temperatures of which can be adjusted separately.

4. Apparatus according to claim 1, wherein the mechanical means for the stepwise advance of the film is constituted by a movable table which is equipped with a film-clamping device and to which is imparted a translatory reciprocatory movement by means of a variablemotion rod, one end of which engages in a transverse groove in the table.

* * * * *